United States Patent [19]

Horikawa et al.

[11] Patent Number: 5,909,446
[45] Date of Patent: Jun. 1, 1999

[54] ADDRESS RESOLUTION SYSTEM

[75] Inventors: Koichi Horikawa; Atsushi Iwata, both of Tokyo, Japan

[73] Assignee: NEC Corporation, Japan

[21] Appl. No.: 08/907,831

[22] Filed: Aug. 14, 1997

[30] Foreign Application Priority Data

Aug. 15, 1996 [JP] Japan .................................. 8-215747

[51] Int. Cl.⁶ ........................................................ H04J 3/11
[52] U.S. Cl. ........................................................ 370/469
[58] Field of Search .................................. 370/396, 410, 370/465, 395, 397, 399, 466, 467, 469, 474, 495, 401, 402, 409, 414, 455, 453, 905; 379/201, 207, 219, 220, 229, 230; 395/200.02, 200.09, 200.11, 200.12, 823

[56] References Cited

U.S. PATENT DOCUMENTS 5,491,693  2/1996  Britton et al. ........................ 370/401
5,600,644  2/1997  Chang et al. ........................ 370/404
5,617,540  4/1997  Civanlar et al. ................... 395/200.11

OTHER PUBLICATIONS

James V. Luciani, et al., "NBMA Next Hop Resolution Protocol (NHRP)", Routing Over Large Clouds Working Group, Internet–Draft, expires Dec. 1996, pp. 1–48.

Primary Examiner—Ajit Patel
Assistant Examiner—Chi ho Andrew Lee
Attorney, Agent, or Firm—Ostrolenk, Faber, Gerb & Soffen, LLP

[57] ABSTRACT

In an NHRP (NBMA Next Hop Resolution Protocol) address resolution system for transforming a network layer address to a data link layer address in an NBMA (Non-Broadcast, Multi-Access) network not sharing media, an NHRP processing section provides a function of resolving an address while an ATMARP (Asynchronous Transfer Mode Address Resolution Protocol) processing section provides a function of resolving an address on the basis of the ATMARP. A holding section is selectively accessed by the NHRP processing section or ATMARP processing section for holding address information registered by the NHRP or address information registered by the ATMARP. When the NHRP processing section receives an NHRP resolution request packet requesting for a resolution of the address of a given ATMARP terminal's address, the processing section sends, if the ATMARP terminal and a terminal sent the NHRP resolution request packet do not belong to the same subnetwork, a reply representative of the address information of an interface received the request packet.

4 Claims, 5 Drawing Sheets

*Fig. 3*

| IP ADDRESS | ATM ADDRESS | TYPE |
|---|---|---|
| | | |
| | | |
| ... | ... | ... |
| | | |

ADDRESS RESOLUTION SYSTEM

BACKGROUND OF THE INVENTION

The present invention relates to an address resolution system for an NBMA (Non-Broadcast, Multi-Access) network and using an NHRP (NBMA Next Hop Resolution Protocol) and, more particularly, to an address resolution system in which the NHRP and a conventional ATMARP (Asynchronous Transfer Mode Address Resolution Protocol) are interoperable.

The NHRP is discussed in IETF (Internet Engineering Task Force) as an address resolution protocol for the NBMA network. The specifications of the NHRP are described in, e.g., draft-ietf-rolc-nhrp-08.txt. In the following description, the NBMA network and its upper protocol are respectively assumed to be, but not limited to, an ATM (Asynchronous Transfer Mode) network and an IP (Internet Protocol).

Generally, to hold IP communication on the ATM network, means for obtaining an ATM address from the IP address of the other terminal is necessary. For this purpose, the NHRP scheme assigns the control of the IP address and ATM Address pairs of ATM terminals connected to the ATM network to distributed NHRP servers (NHSs) each being located at a particular area, e.g., LIS (Logical IP Subnetwork).

Assume that an ATM terminal intends to solve an ATM address for the EP address of another ATM terminal to communicate with, it sends an NHRP resolution request packet to a preselected NHS. If the NHS which received the request packet can resolve the address, it returns an NHRP resolution reply packet to the above ATM terminal. If otherwise, the NHS transfers the request packet to another NHS which seems to be controlling the IP address to be resolved. As a result, the request packet is sequentially transferred between a plurality of NHSs until it reaches an NHS capable of resolving the address.

Therefore, even if the other ATM terminal belongs to an LIS different from the LIS of the ATM terminal intending to solve the ATM address, the ATM address can be solved so long as the other ATM terminal is directly connected to the ATM network. If the other ATM terminal is not directly connected to the ATM network, there can be resolved the ATM address of a router (gateway) located at the outlet of the ATM network.

The ATMARP is another address resolution protocol for the ATM network and already standardized by IETF Requests for Comments (RFC). In the case of the ATMARP, address resolution is limited to the same LIS, and an ATMARP request packet is not transferred between different ATMARP servers.

The NHRP and ATMARP are entirely different protocols and have not heretofore been provided with interoperability.

When an LIS implemented with ATMARP adopts the NHRP as a new address resolution protocol, all the terminals belonging to the LIS must be replaced with terminals adaptive to the NHRP because the conventional NHRP servers cannot deal with the ATMARP. This prevents existing terminals using the ATMARP and terminals newly using the NHRP from existing together in the same LIS.

A simple solution to the above problem may be to have an NHRP server to play the role of an ATMARP server at the same time, i.e., causing an NHRP server and an ATMARP server to share the address information of NHRP terminals and ATMARP terminals. This, however, brings about the following problems. Even when a given NHRP terminal intends to resolve the address of an ATMARP terminal belonging to an LIS different from the LIS of the NHRP terminal, the ATM address of the ATMARP terminal itself can be resolved. Then, the NHRP terminals sets up SVC (Switched Virtual Connection) to the ATMARP terminal and then sends an IP packet via the SVC. At this instant, assume that the ATMARP terminal whose address should be resolved intends to send an IP packet to the NHRP terminal. Then, the ATMARP terminal resolves the ATM address of a router, or IP Next Hop, on the route to the NHRP terminal, sets up SVC to the router, and then sends an IP packet. That is, a different SVC is set up for each of transmission and receipt between the ATMARP terminal and the NHRP terminal, simply wasting the SVC set up by the NHRP terminal.

Moreover, the ATMARP terminal may expect that an IP packet from a different LIS arrives at the ATMARP terminal by way of the packet filtering function of a router belonging to the same LIS. However, because the NHRP terminal directly sets up an SVC to the ATMARP terminal, as stated above, the filtering function at the IP level available with the router cannot be used.

SUMMARY OF THE INVENTION

It is therefore an object of the present invention to provide an address resolution system in which even when an LIS implemented with the ATMARP for the address resolution protocol of an ATM network adopts the NHRP as a new address resolution protocol, it is not necessary to replace all the terminals belonging to the LIS with terminals adaptive to the NHRP, i.e., terminals using the existing ATMARP and terminals newly using the NHRP can exist together in the same LIS.

It is another object of the present invention to provide an address resolution system in which even an NHRP terminal belonging to a given LIS intends to resolve the address of an ATMARP terminal belonging to a different LIS, the address of the gateway to the ATMARP terminal can be resolved.

In accordance with the present invention, in an NHRP (NBMA Next Hop Resolution Protocol) address resolution system for transforming a network layer address to a data link layer address in an NBMA network not sharing media, an NHRP processing section provides a function of resolving an address while an ATMARP processing section provides a function of resolving an address on the basis of the ATMARP. A holding section is selectively accessed by the NHRP processing section or ATMARP processing section for holding address information registered by the NHRP or address information registered by the ATMARP. When the NHRP processing section receives an NHRP resolution request packet requesting for a resolution of the address of a given ATMARP terminal's address, the processing section sends, if the ATMARP terminal and a terminal sent the NHRP resolution request packet do not belong to the same subnetwork, a reply representative of the address information of an interface received the request packet.

BRIEF DESCRIPTION OF THE DRAWINGS

The above and other objects, features and advantages of the present invention will become apparent from the following detailed description taken with the accompanying drawings in which:

FIG. 3 shows the configuration of an address information cache; and

DESCRIPTION OF THE PREFERRED EMBODIMENT

A preferred embodiment of the address resolution system in accordance with the present invention will be described hereinafter.

Figure 1:
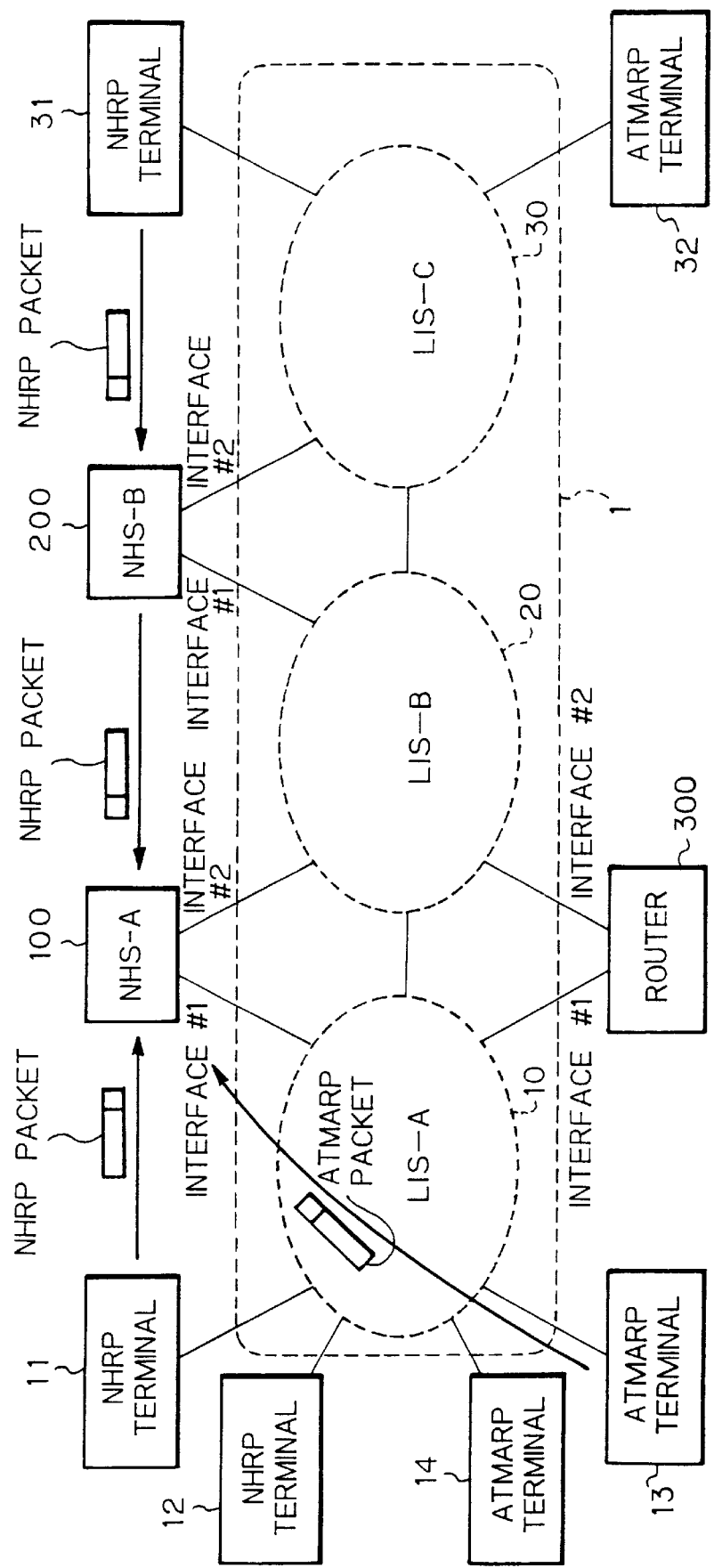
FIG. 1 shows a network to which the present invention is applicable.

As shown in FIG. 1, assume a single ATM network 1 in which a plurality of LISs (LIS-A 10, LIS-B 20 and LIS-C 30) are defined. Terminals directly connected to the ATM network 1 (e.g. NHRP terminals 11 and 31) are assumed to be capable of setting up an SVC to each other at the ATM level. It is to be noted that ATM switches constituting the network 1 are not shown, and that only a part of lines connecting them is shown.

There are also shown in FIG. 1 NHRP servers NHS-A 100 and NHS-B 200. The server NHS-A 100 has an interface belonging to the LIS-A 10 and LIS-B 20 while the server NHS-B 200 has an interface belonging to the LIS-B 20 and LIS-C 30. In the illustrative embodiment, assume that the server NHS-A 100 controls the LIS-A 10, and that the server NHS-B 200 controls the LIS-B 20 and LIS-C 30. The NHRP terminal 11 and an NHRP terminal 12 belong to the LIS-A 10 while the NHRP terminal 31 belongs to the LIS-C 30. ATMARP terminals 13 and 14 belong to the LIS-A while the ATMARP terminal 32 belongs to the LIS-C 30. A router 300 belongs to the LIS-A 10 and LIS-B 20.

Figure 2:
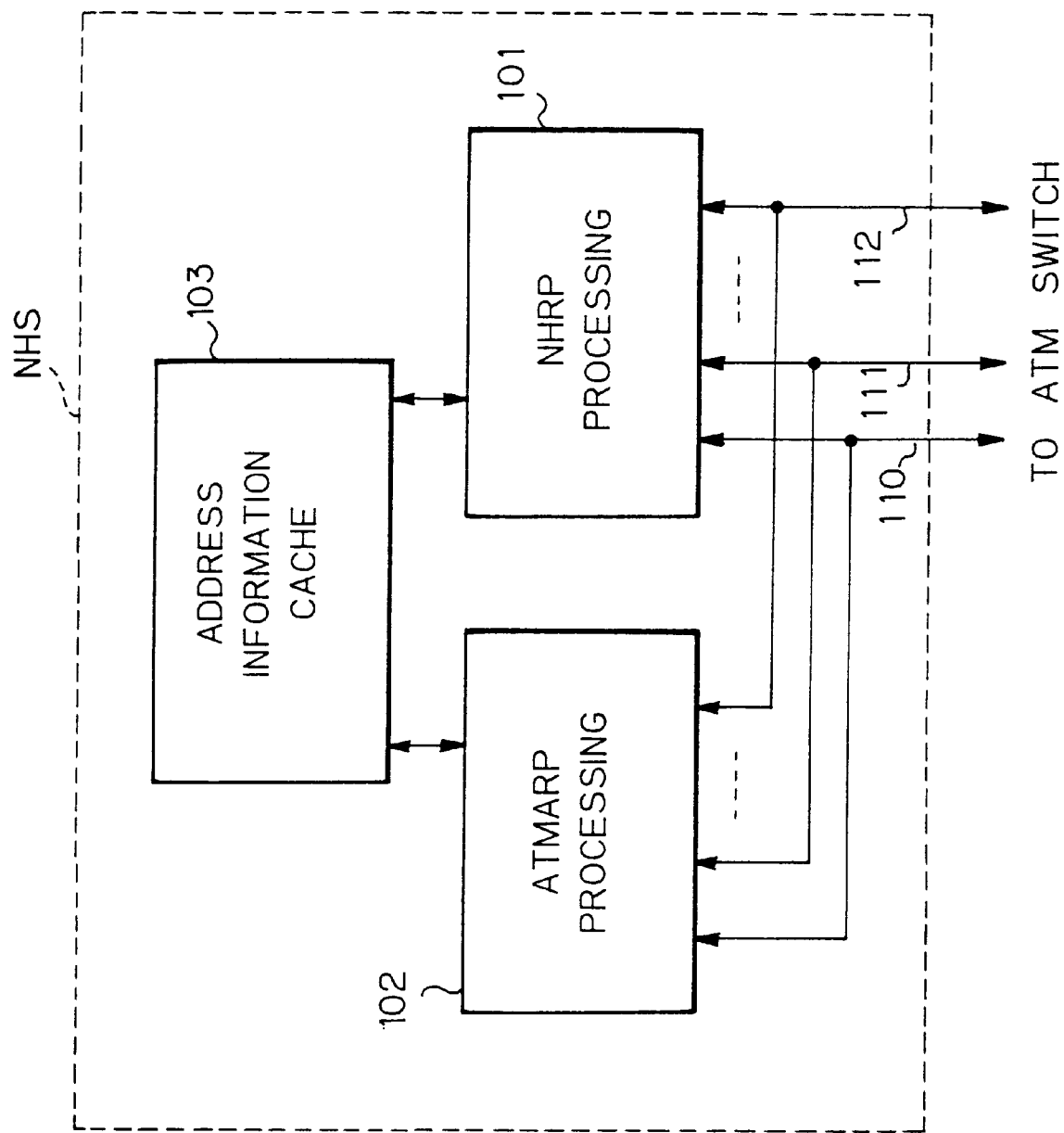
FIG. 2 is a block diagram schematically showing an NHS.

FIG. 2 shows the construction of each NHSs. As shown, each NHS includes an NHRP processing 101 having a plurality of interfaces 110, 111 and 112 each being assigned to a particular LIS. Specifically, the interfaces 110–112 are connected to ATM switches constituting the ATM network 1 shown in FIG. 1. The NHRP processing 101 plays the role of a conventional NHRP server. An ATMARP processing 102 shares the interfaces 110–112 with the NHRP processing 101 and plays the role of an ATMARP server. An address information cache 103 stores the address information of an NHRP terminal which the NHRP processing 101 obtained by, e.g., receiving an NHRP registration packet, and stores the address information of an ATMARP terminal which the ATMARP processing 102 obtained by receiving an InATMARP reply.

Figure 3:
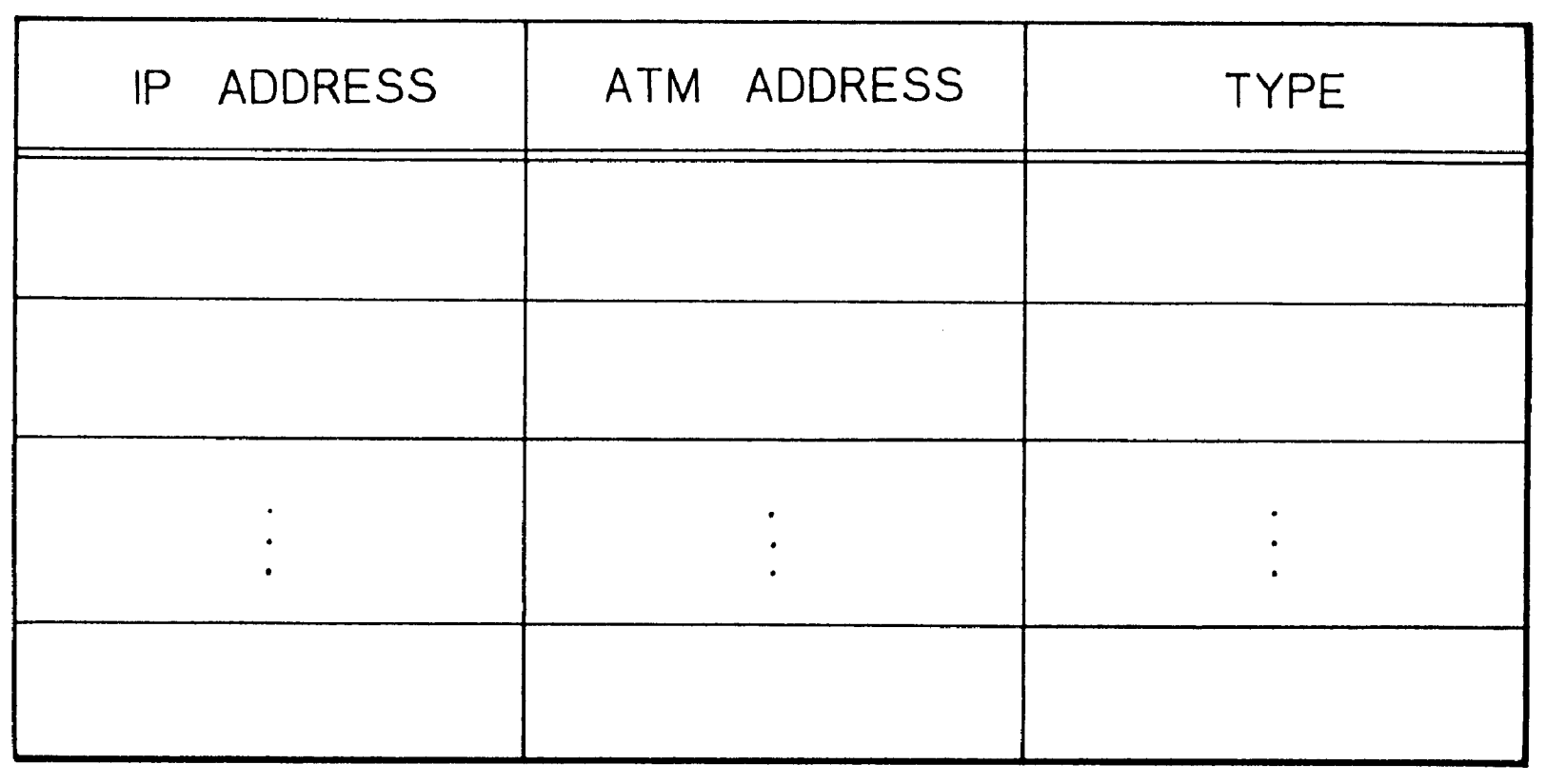

FIG. 3 shows the configuration of the address information cache 103. As shown, the cache 103 has an IP address field, an ATM address field and a type field for each entry. If a certain entry is obtained by the NHRP processing 101, "NHRP" is written to the type field of the entry. If the entry is obtained by the ATMARP processing 102, "ATMARP" is written to the type field.

The operation of the illustrative embodiment is as follows. In FIG. 1, the NHRP terminals 11 and 12 each sends an NHRP registration packet to the server NHS-A 100 so as to register its own address information. The NHRP processing 101 of the server NHS-A 100 receives the NHRP registration packets and stores the obtained address information of the NHRP terminals 11 and 12 in the address information cache 103 (type field=NHRP).

The ATMARP processing 102 included in the server NHS-A 100 sends an In ATMARP request to each of the ATMARP terminals 13 and 14. In response, the ATMARP terminals 13 and 14 send InATMARP reply packets to the ATMARP processing 102. The ATMARP processing 102 receives the reply packets stores the obtained address information of the ATMARP terminals 13 and 14 in the address information cache 103 (type field=ATMARP).

An address resolution procedure depends on the kind of the terminal to be subjected to resolution (NHRP terminal or ATMARP terminal), the kind of the other terminal to communicate with, and the LIS to which the other terminal belongs. Specifically, there are four different cases to be dealt with, as follows:

(1) communication between NHRP terminals or between ATMARP terminals;

(2) communication of an NHRP terminal with an ATMARP terminal belonging to the same LIS;

(3) communication of an ATMARP terminal with an NHRP terminal belonging to the same LIS; and (4) communication of an NHRP terminal with an ATMARP terminal belonging to a different LIS First, as for the case (1), assume that the NHRP terminal 11 intends to resolve the address of the NHRP terminal 12 or that of the NHRP terminal 31. Then, the NHRP terminal 11 sends an NHRP resolution request packet to the server NHS-A 100 so as to resolve the address, as usual. When the ATMARP terminal 13 intends to solve the address of the ATMARP terminal 14 or intends to solve the address of the router 300 in order to communicate with the ATMARP terminal 32 not belonging to the LIS-A 10, it sends an ATMARP request to the server NHS-A 100 so as to resolve the address, as usual.

Figure 4A:
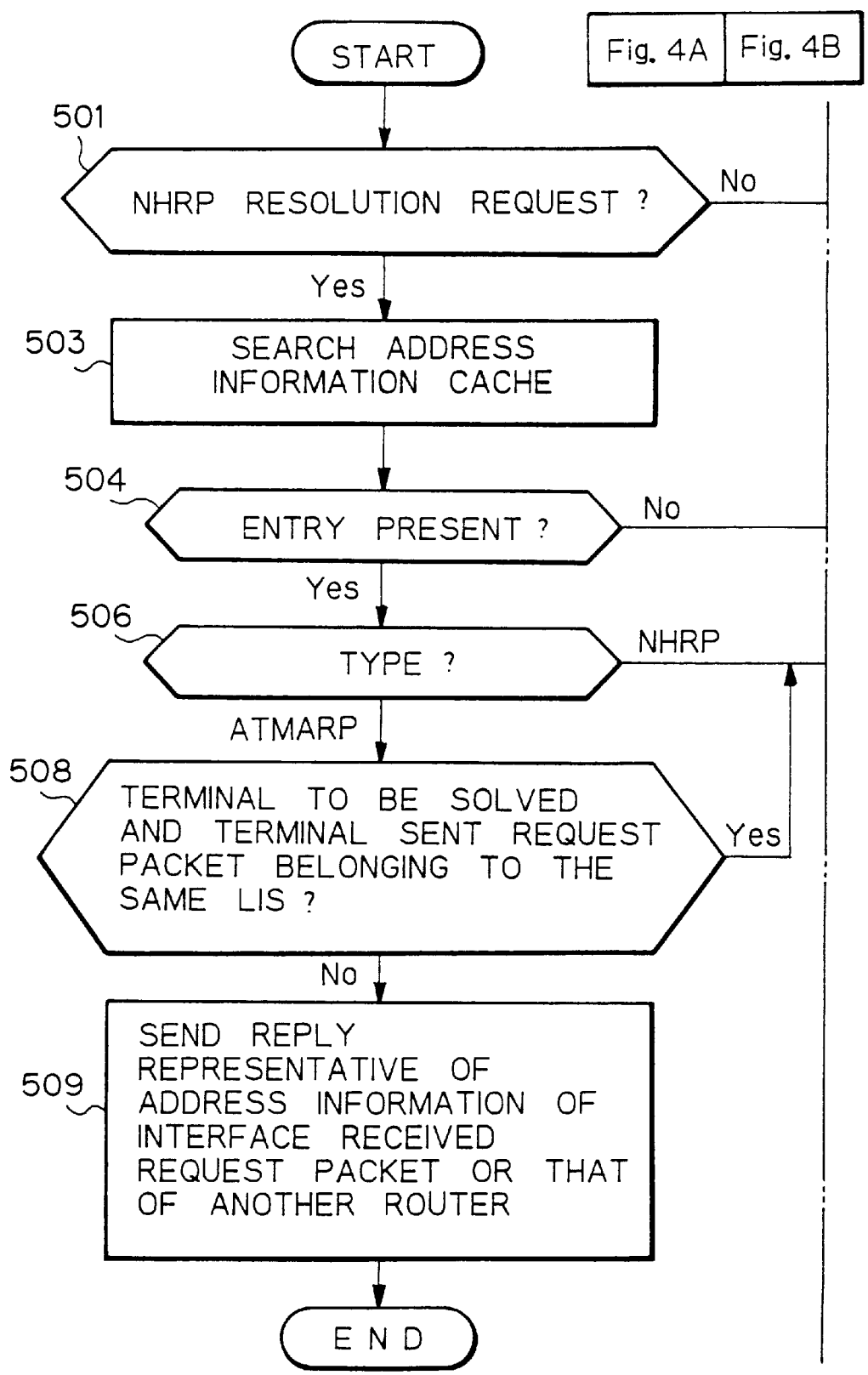
FIG. 4 is a flowchart representative of an address resolution system embodying the present invention.
Figure 4B:
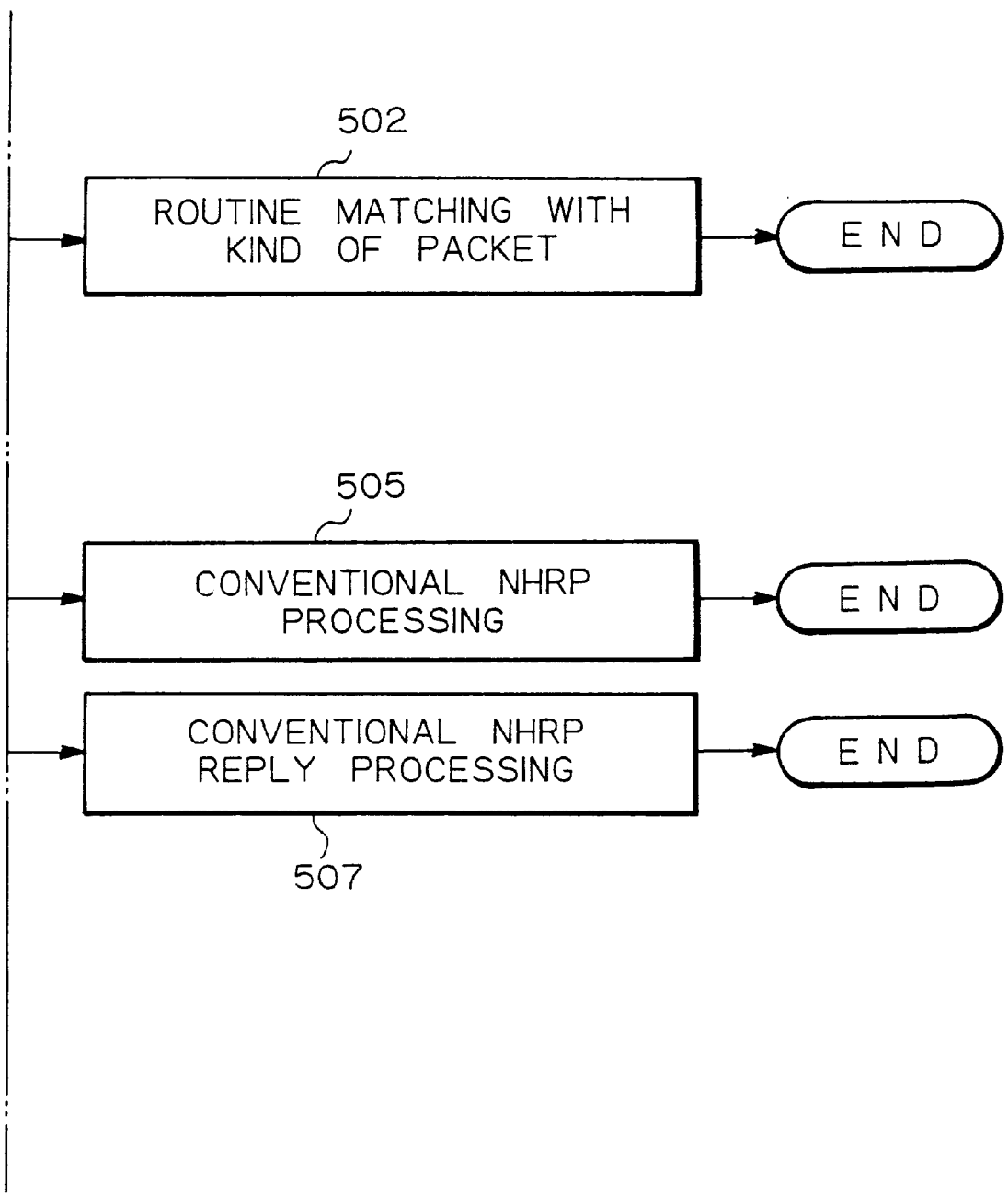

As for the case (2), assume that the NHRP terminal 11 intends to resolve the address of the ATMARP terminal 13. Then, the NHRP terminal 11 sends an NHRP resolution request packet to the server NHS-A 100. The NHRP processing 101 included in the server NHS-A 100 receives the above packet and performs the following operation. As shown in FIG. 4, the NHRP processing 101 determines whether or not the received packet is an NHRP resolution request packet (step 501). If the answer of this decision is negative (No, step 501), the processing 101 executes a routine matching with the kind of the received packet (conventional). If the answer of the step 501 is positive (Yes), the processing 101 searches the address information cache 103 to see if an entry including an IP address to be resolved is present (step 503). If such an entry is absent in the cache 103, the processing 101 executes the conventional NHRP processing (step 505). If the above entry, i.e., the address information of the ATMARP terminal 13 is present in the cache 103, the processing 101 reads a type written to the type field of the entry (step 506).

In this case, the type written to the type field is ATMARP. Therefore, the processing 101 determines whether or not the terminal to be resolved and the terminal sent the NHRP address request packet belong to the same LIS (step 508). Because the ATMARP terminal 13 (to be solved) and the NHRP terminal 11 (sent the request packet) belong to the same LIS (Yes, step 508), the processing 101 returns a reply, as usual. As a result, the NHRP terminal 11 and ATMARP terminal 13 directly set up an SVC therebetween and then communicate with each other.

As for the case (3), assume that the ATMARP terminal 13 intends to resolve the address of the NHRP terminal 11. Then, the ATMARP terminal 13 sends an ATMARP request packet to the server NHS-A 100. The ATMARP processing 102 in the server NHS-A 100 receives the ATMARP request packet and searches the address information cache 103 to see if an entry including an IP address to be resolved is present. If such an entry is present in the cache 103, the processing 102 sends a reply representative of the address information of the above entry to the ATMARP terminal 13 without regard to its type, i.e., whether the type is NHRP or ATMARP. In this case, the address information of the NHRP terminal 11 is present in the cache 103, so that the ATMARP terminal 13 can resolve the address of the NHRP terminal 11. As a result, the ATMARP terminal 13 and NHRP terminal 11 directly set up an SVC therebetween and communicate with each other.

As for the case (4), assume that the NHRP terminal 31 intends to resolve the address of the ATM terminal 13. Then, the NHRP terminal 31 sends an NHRP resolution request to the server NHS-B 200. The NHRP processing 101 included in the server NHS-B 200 receives the NHRP resolution request and executes the steps 501, 503 and 504 shown in FIG. 4 so as to determine whether or not a corresponding entry is present in the cache 103 of the server NHS-B 200. If the corresponding entry is absent in the cache 103, the processing 101 transfers the above request packet to the server NHS-A 100 (step 505) (conventional).

On receiving the request packet, the NHRP processing 101 of the server NHS-A 100 executes the steps 501, 503 and 504 so as to determine whether or not the corresponding entry is present in the associated cache 103. If the corresponding entry, i.e., the address information of the ATMARP terminal 13 is present in the cache 103, the processing 101 reads the type field of the entry (step 506).

Because the type is ATMARP, as determined in the step 506, the processing 101 determines whether or not the terminal to be solved and the terminal sent the NHRP resolution request packet belong to the same LIS (step 508). Because the ATMARP terminal 13 (to be solved) and NHRP terminal 31 (sent the request packet) do not belong to the same LIS (No, step 508), the processing 101 executes a step 509.

In the step 509, the processing 101 sends a reply representative of the address information of the interface which received the request packet (interface #2, FIG. 1) to the NHRP terminal 31). Alternatively, the processing 101 sends to the NHRP terminal 31 a reply representative of the address information of, among the interfaces of a router (router 300) transferring packets between the LIS to which the interface received the request packet belongs (LIS-B 20) and the LIS to which the terminal (ATMARP terminal 13) to be solved belongs, the interface connected to the LIS to which the interface received the request packet belongs (interface #2 of the router 300).

On receiving the reply from the processing 101, the NHRP terminal 31 sets up an SVC based on the resolved ATM address and then sends an IP packet via the SVC. Because the SVC is once terminated at the server NHS-A 100 or the router 300, the IP packet sent from the NHRP terminal 31 arrives at the IP layer of the server NHS-A 100 or that of the router 300. The IP packet is dealt with by the IP layer of the server NHS-A 100 or that of the router 300.

From the server NHS-A 100 or the router 300 to the ATMARP terminal 13, the address is resolved by either one of the NHRP function and ATMARP function. Then, an SVC is set up. As a result, the NHRP terminal 31 and ATMARP terminal 13 do not directly communicate with each other, but communicate by way of the server NHS-A 100 or the router 300. In this condition, there can be used, e.g., a packet filtering function at the IP level. In addition, a single SVC path is set up for both transmission and receipt between the NHRP terminal 31 and the ATMARP terminal 13.

In summary, it will be seen that the present invention provides an address resolving system having various unprecedented advantages, as enumerated below.

(1) Even when an LIS implemented with the ATMARP for the address resolution protocol of an ATM network adopts the NHRP as a new address resolution protocol, it is not necessary to replace all the terminals belonging to the LIS with terminals adaptive to the NHRP. That is, terminals using the existing ATMARP and terminals newly using the NHRP can exist together in the same LIS. This is because, each server NHS can deal with both the NHRP and ATMARP and has a common address information cache.

(2) Even if an NHRP terminal belonging to a given LIS intends to resolve the address of an ATMARP terminal belonging to a different LIS, the address of the gateway to the ATMARP terminal can be resolved. This is because a server NHS to reply resolves not the ATM address of the ATMARP terminal itself, but the address of an NHS controlling a subnetwork to which the ATMARP terminal belongs or the address of the another router.

(3) When an NHRP terminal and an ATMARP terminal each belonging to a different subnetwork hold communication, the packet filtering function of the above gateway can be used. This is because the NHRP terminal sets up an SVC to the above gateway and sends an IP packet to the gateway via the SVC on the basis of the above advantage (2).

(4) A SVC is prevented from being wastefully set up. This is because an NHRP terminal and an ATMARP terminal each belonging to a different subnetwork do not directly communicate via an SVC, but communicate by way of a gateway on the basis of the above advantage (2). Therefore, a single SVC path is set up for both transmission and receipt between the NHRP terminal and the ATMARP terminal.

Various modifications will become possible for those skilled in the art after receiving the teachings of the present disclosure without departing from the scope thereof.

What is claimed is:

1. An NHRP address resolution system for transforming a network layer address to a data link layer address in an NBMA network not sharing media, said system comprising:

NHRP processing means for providing a function of resolving an address;

ATMARP processing means for providing a function of resolving an address on the basis of an ATMARP; and holding means selectively accessed by said NHRP processing means and said ATMARP processing means, for holding address information registered by an NHRP or address information registered by said ATMARP;

wherein when said NHRP processing means receives an NHRP resolution request packet requesting for a resolution of an address of a given ATMARP terminal's address, said NHRP processing means sends, if said ATMARP terminal and a terminal sent said NHRP resolution request packet do not belong to a same subnetwork, a reply representative of address information of an interface which received said NHRP resolution request packet.

2. A system as claimed in claim 1, wherein said address information represented by said reply comprises the address information of, among interfaces of a router transferring packets between a subnetwork to which said interface received said NHRP resolution request packet belongs and a subnetwork to which said ATMARP terminal whose address should be solved belongs, the interface connected to said subnetwork to which said interface received said NHRP resolution request packet belongs.

3. An NHRP address resolution system for transforming a network layer address to a data link layer address in an NHRP network not sharing media, the system comprising:

an NHRP processor resolving an address in response to an NHRP resolution request;

ATMARP processor resolving an address in response to an ATMARP resolution request; and an address information memory coupled to the NHRP processor and coupled to the ATMARP processor, the address information memory storing address information registered by at least one NHRP terminal and storing address information registered by at least one ATMARP terminal;

wherein when said NHRP processor receives an NHRP resolution request from a requesting terminal for a resolution of an address of a destination ATMARP terminal, the NHRP processor sends, if the destination ATMARP terminal and the requesting terminal do not belong to a same subnetwork, a reply representative of address information of an interface which received said NHRP resolution request.

4. A system as claimed in claim 3, wherein the address information represented by said reply comprises the address information of, among interfaces of a router transferring packets between a subnetwork to which the interface that received the NHRP resolution request belongs and a subnetwork to which the destination ATMARP terminal belongs, the interface connected to the subnetwork to which the interface that received the NHRP resolution request belongs.

* * * * *